(12) United States Patent
Rakowski

(10) Patent No.: US 9,580,789 B2
(45) Date of Patent: *Feb. 28, 2017

(54) METHOD FOR REDUCING FORMATION OF ELECTRICALLY RESISTIVE LAYER ON FERRITIC STAINLESS STEELS

(71) Applicant: ATI Properties LLC, Albany, OR (US)

(72) Inventor: James M. Rakowski, Allison Park, PA (US)

(73) Assignee: ATI Properties LLC, Albany, OR (US)

( * ) Notice: Subject to any disclaimer, the term of this patent is extended or adjusted under 35 U.S.C. 154(b) by 254 days.

This patent is subject to a terminal disclaimer.

(21) Appl. No.: 13/873,272

(22) Filed: Apr. 30, 2013

(65) Prior Publication Data

US 2013/0266892 A1    Oct. 10, 2013

Related U.S. Application Data

(63) Continuation of application No. 12/042,751, filed on Mar. 5, 2008, now Pat. No. 8,529,709.

(Continued)

(51) Int. Cl.
*C23C 8/10* (2006.01)
*H01M 8/0202* (2016.01)
(Continued)

(52) U.S. Cl.
CPC .................. *C23C 8/10* (2013.01); *C21D 1/74* (2013.01); *C21D 3/02* (2013.01); *C21D 6/002* (2013.01);
(Continued)

(58) Field of Classification Search
CPC . C21D 1/74; C21D 3/02; C21D 6/002; C21D 6/008; H01B 1/02; H01M 8/00;
(Continued)

(56) References Cited

U.S. PATENT DOCUMENTS 3,650,848 A    3/1972    Schneider et al.
5,830,291 A    11/1998    McGuire et al.
(Continued)

FOREIGN PATENT DOCUMENTS

EP    1630243 A2    3/2006
JP    62-156254 A    7/1987
(Continued)

OTHER PUBLICATIONS

"IV.A.1 Evaluation of a Functional Interconnect System for SOFCs", Office of Fossil Energy Fuel Cell Program, FY 2007 Annual Report, pp. 43-46.
(Continued)

*Primary Examiner* — Lois Zheng
(74) *Attorney, Agent, or Firm* — K&L Gates LLP

(57) ABSTRACT

A method of reducing the formation of electrically resistive scale on a an article comprising a silicon-containing ferritic stainless subjected to oxidizing conditions in service includes, prior to placing the article in service, subjecting the article to conditions under which silica, which includes silicon derived from the steel, forms on a surface of the steel. Optionally, at least a portion of the silica is removed from the surface to placing the article in service. A ferritic stainless steel alloy having a reduced tendency to form silica on at least a surface thereof also is provided. The steel includes a near-surface region that has been depleted of silicon relative to a remainder of the steel.

20 Claims, 6 Drawing Sheets

Related U.S. Application Data

(60) Provisional application No. 60/905,219, filed on Mar. 6, 2007.

(51) Int. Cl.

| | | |
|---|---|---|
| *C21D 1/74* | (2006.01) | |
| *C21D 3/02* | (2006.01) | |
| *C21D 6/00* | (2006.01) | |
| *C23C 8/08* | (2006.01) | |
| *H01M 8/02* | (2016.01) | |
| *H01B 1/02* | (2006.01) | |
| *H01M 8/00* | (2016.01) | |
| *H01M 4/64* | (2006.01) | |
| *H01M 8/12* | (2016.01) | |

(52) U.S. Cl.
CPC ............... *C21D 6/008* (2013.01); *C23C 8/08* (2013.01); *H01B 1/02* (2013.01); *H01M 8/00* (2013.01); *H01M 8/021* (2013.01); *H01M 8/0228* (2013.01); *H01M 2008/1293* (2013.01); *Y02E 60/50* (2013.01); *Y02E 60/525* (2013.01)

(58) Field of Classification Search
CPC .......... H01M 8/21; H01M 8/10; H01M 8/228; C23C 8/08; C23C 8/10
See application file for complete search history.

(56) References Cited

U.S. PATENT DOCUMENTS

| | | | |
|---|---|---|---|
| 5,944,917 | A | 8/1999 | Takeda et al. |
| 6,290,790 | B1 | 9/2001 | Wind et al. |
| 2005/0045250 | A1* | 3/2005 | Rakowski ............... 148/241 |
| 2008/0236710 | A1 | 10/2008 | Rakowski |

FOREIGN PATENT DOCUMENTS

| | | |
|---|---|---|
| JP | 1-168811 A | 7/1989 |
| JP | 2000-265248 A | 9/2000 |
| JP | 2004-232074 A | 8/2004 |
| WO | WO 2005/073423 | 8/2005 |
| WO | WO 2006/138070 A1 | 12/2006 |

OTHER PUBLICATIONS

Alman, D.E. et al. "Effect of minor elements and a Ce surface treatment on the oxidation behavior of an Fe-22Cr-0.5Mn (Crofer 22 APU) ferritic stainless steel", International Journal of Hydrogen Energy 32 (2007), Elsevier Ltd., pp. 3743-3753.

Hammer et al., "The Oxidation of Ferritic Stainless Steels in Simulated Solid-Oxide Fuel-Cell Atmospheres", Oxidation of Metals, vol. 67, Nos. 1/2, Feb. 2007, pp. 1-38.

Chen et al., "Protective Coating on Stainless Steel Interconnect for SOFCs: Oxidation Kinetics and Electrical Properties", Solid State Ionics, 176 (2005), Elsevier, pp. 425-433.

"III.A.2 Metal Interconnect for SOFC Power Systems", Office of Fossil Energy Fuel Cell Program, FY 2004 Annual Report, pp. 44-46.

Simner et al., "Long-Term SOFC Stability with Coated Ferritic Stainless Steel Interconnect", Ceramic Engineering and Science Proceedings, vol. 26, No. 4, 2005, pp. 83-90.

"III.A.1 Evaluation of a Functional Interconnect System for SOFCs", 2006 Office of Fossil Energy Fuel Cell Program Annual Report, Sep. 2006, pp. 33-38.

U.S. Appl. No. 13/873,270, filed Apr. 30, 2013.

E-BRITE® Stainless Steel: Superferritic (UNS 44627, ASTM Type XM-27), ATI Technical Data Sheet, Version 1, Sep. 28, 2012, 7 pages.

E-BRITE® Superferritic UNS S44627 accessed Aug. 24, 2015 at http://www.atimetals.com/products/pages/e-brite.aspx, 3 pages.

* cited by examiner

METHOD FOR REDUCING FORMATION OF ELECTRICALLY RESISTIVE LAYER ON FERRITIC STAINLESS STEELS

CROSS-REFERENCE TO RELATED APPLICATION

This application claims priority under 35 U.S.C. §120 as a continuation application of co-pending U.S. patent application Ser. No. 12/042,751, filed Mar. 5, 2008, entitled METHOD FOR REDUCING FORMATION OF ELECTRICALLY RESISTIVE LAYER ON FERRITIC STAINLESS STEELS, which in turn claims priority under 35 U.S.C. §119(e) to U.S. Provisional Patent Application Ser. No. 60/905,219, filed Mar. 6, 2007. Both of application Ser. Nos. 12/042,751 and 60/905,219 are incorporated by reference herein in their entireties.

STATEMENT REGARDING FEDERALLY SPONSORED RESEARCH OR DEVELOPMENT

Certain of the research leading to the present invention was funded by the United States government under Department of Energy Cooperative Agreement DE-FC26-05NT42513. The United States may have certain rights in the invention.

BACKGROUND OF THE TECHNOLOGY

Field of Technology

The present disclosure relates to methods for limiting the formation of an electrically resistive surface layer or "scale" on stainless steels when the steels are subjected to high-temperature, oxidizing conditions. The present disclosure also relates to stainless steels and articles of manufacture including stainless steels, wherein the steels have a reduced tendency to form electrically resistive scale thereon when the steels are subjected to high-temperature, oxidizing conditions.

Description of the Background of the Technology

Fuel cells are energy conversion devices that generate electricity and heat by electrochemically combining a gaseous fuel and an oxidizing gas via an ion-conducting electrolyte. Fuel cells convert chemical energy directly into electrical energy in the absence of combustion, providing significantly higher conversion efficiencies than reciprocating engines, gas turbines, and certain other conventional thermomechanical energy production devices. In addition, for the same power output, fuel cells produce substantially less carbon dioxide emissions than fossil fuel-based power generation technologies. Fuel cells also produce negligible amounts of $SO_x$ and $NO_x$, the main constituents of acid rain and photochemical smog.

Several types of fuel cells have been developed, differing primarily in the materials utilized as the fuel cell electrolyte. NASA originally developed alkaline fuel cells including a liquid electrolyte in the 1960's to power Apollo and other spacecraft. Liquid electrolytes, however, typically are corrosive and can be difficult to handle. Solid oxide fuel cells (SOFCs), in contrast, are constructed entirely of solid-state materials and employ a fast oxygen ion-conducting ceramic material as the electrolyte. SOFCs operate in a temperature range of about 500° C.-1000° C. to facilitate solid-state transport. The advantages of SOFCs include high energy efficiency and relatively few problems with electrolyte management. SOFCs also produce high-grade waste heat, which can be used in combined heat and power devices, and harnessed for internal reforming of hydrocarbon fuels.

A single SOFC subunit or "cell" includes an anode and a cathode, separated by the electrolyte. During operation of the SOFC cell, an oxidant (such as oxygen or air) is fed into the fuel cell on the cathode side, where it supplies oxygen ions to the electrolyte by accepting electrons from an external circuit through the following half-cell reaction:

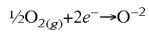

The oxygen atoms pass through the ceramic electrolyte via solid state diffusion to the electrolyte/anode interface. The SOFC can employ hydrogen ($H_2$) and/or carbon monoxide (CO) as a basic fuel. Operationally, pure hydrogen can be used as supplied. If a hydrocarbon fuel such as methane, kerosene, or gasoline is used, it must first be partially combusted, or "reformed", to provide hydrogen and carbon monoxide. This may be accomplished internally within the fuel cell, aided by the high cell operating temperature and by steam injection. The fuel gas mixture penetrates the anode to the anode/electrolyte interface, where it reacts with the oxygen ions from the ion-conducting electrolyte in the following two half-cell reactions:

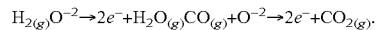

These reactions release electrons, which re-enter the fuel cell's external circuit. The flow of electrical charge due to oxygen ion transport through the electrolyte from cathode to anode is balanced exactly by the flow of electrical charge through electron conduction in the external circuit. The cell's driving force is the need to maintain overall electrical charge balance. The flow of electrons in the external circuit provides useful power.

To generate a reasonable voltage, fuel cells are not operated as single units, but instead as "stacks" composed of a series arrangement of many individual cells, with an "interconnect" joining and conducting current between the anode and cathode of each of the immediately adjacent cells. A common stack design is the flat-plate or "planar" SOFC (PSOFC), which is shown in a schematic form in FIG. 1. In the PSOFC 10 of FIG. 1, a single energy conversion cell 12 includes a cathode 20 and an anode 30 separated by the electrolyte 40. An interconnect 50 separates the anode 30 from the cathode 60 of an immediately adjacent energy conversion cell 14 (not fully shown) within the stack. Thus, PSOFC 10 includes a repeating arrangement of cells, substantially identical to cell 12, with an interconnect disposed between each adjacent cell.

The interconnects are critical SOFC components and serve several functions, including separating and containing the reactant gases, providing a low resistance current pathway to electrically connect the cells in series, and providing structural support for the stack. The interconnects must be made of a material that can withstand the harsh, high-temperature environment within the cells, must remain suitably electrically conductive throughout the fuel cell's service life, and must have a coefficient of thermal expansion (CTE) that is sufficiently similar that of the cells' ceramic components to ensure that the stack's requisite structural integrity and gas-tightness is maintained. Initial PSOFC designs utilized $LaCrO_3$ ceramic interconnects. $LaCrO_3$ ceramic does not degrade at the high SOFC operating temperatures and has a CTE that substantially matches the other ceramic components of the fuel cell. $LaCrO_3$ ceramic, however, is brittle, difficult to fabricate, and expensive.

To address deficiencies of ceramic electrolytes, interconnects have been made from certain metal alloys. Metallic interconnects are desirable for reasons including their relatively low manufacturing cost, high electrical and thermal conductivities, and ease of fabrication, which aids in the formation of gas channels and allows for a high degree of dimensional control. Alloys proposed for interconnect applications include nickel-base alloys (such as AL 600™ alloy), certain austenitic stainless steels (such as Types 304, 309, 310 and other alloys in the 300 Series family), and certain ferritic stainless steels (such as, for example, E-BRITE® alloy and AL 453™ alloy). Table 1 provides nominal compositions for several of the foregoing commercially available nickel-base and stainless steel alloys, all of which are available from ATI Allegheny Ludlum, Pittsburgh, Pa.

TABLE 1

| Alloy | Composition (weight percent) | | | | | | |
|---|---|---|---|---|---|---|---|
| | Ni | Cr | Fe | Al | Si | Mn | Other |
| AL 453 ™ alloy | 0.3 max. | 22 | bal. | 0.6 | 0.3 | 0.3 | 0.06 Ce + La max. |
| E-BRITE ® alloy | 0.15 max. | 26 | bal. | 0.1 | 0.2 | 0.05 | 1 Mo |
| AL 600 ™ alloy | bal. | 15.5 | 8 | — | 0.2 | 0.25 | — |
| Type 304 alloy | 8 | 18 | bal. | — | — | — | — |

Certain characteristics of ferritic stainless steels including at least about 16 weight percent chromium make them particularly attractive for PSOFC interconnect applications including, for example, low cost, excellent machinability, and CTEs compatible with conventional ceramic electrodes. Ferritic stainless steels including 16-30 weight percent chromium and less than 0.1 weight percent aluminum are believed to be particularly suited for interconnect applications. Specific examples of ferritic stainless steels considered suitable for PSOFC interconnect applications include AISI Types 430, 439, 441, and 444 stainless steels, as well as E-BRITE® alloy. The CTEs of the ceramic electrode material lanthanum strontium manganate and AISI Type 430 ferritic stainless steel, for example, are reported to be about $11\text{-}13\times10^{-6}$ and about $9\text{-}12\times10^{-6}$, respectively.

Ferritic stainless steels, however, commonly include moderate levels of silicon, either as an intentional alloying addition or as a residual from the steelmaking process. Silicon is commonly present in ferritic stainless steels at levels of about 0.3 to 0.6 weight percent. Silicon is not commonly added to ferritic stainless steels as an intentional compositional element, but it may be added during the melting of stainless steels as a process element. A portion of the silicon added to the melt, however, unavoidably makes its way into the steel. Therefore, even though silicon is intentionally added in such cases, it may be considered a residual impurity in the steel.

Silicon is detrimental to the operational efficiency of ferritic stainless steel interconnects since it tends to migrate to the steel surface/scale interface and form a thin, generally continuous, highly electrically resistive $SiO_2$ (silica) layer at the interface. Formation of silica at the interface between the steel and the scale formed on the steel increases the contact electrical resistivity of the interconnects over time. This makes it increasingly difficult for electrons to pass through the interface region between the interconnect and the electrodes, and thereby progressively impairs the ability of the interconnects to conduct current between the cells. This process, over time, can significantly reduce the overall efficiency of SOFCs including ferritic stainless steel interconnects. As such, it is one factor considered when selecting a suitable interconnect material from among the various available ceramic and alloy materials.

Accordingly, it would be advantageous to provide a method for eliminating or reducing the tendency for electrically resistive silica to form on the surface of ferritic stainless steels when the steels are subjected to oxidizing conditions, such as conditions to which SOFC interconnects are subjected.

SUMMARY

One aspect of the present disclosure is directed to a method of reducing the tendency for formation of an electrically resistive silica layer on a silicon-containing ferritic stainless steel article when the article is subjected to high temperature, oxidizing conditions when in service. The method includes, prior to placing the article in service, subjecting the article to oxidizing conditions resulting in formation of silica, which includes silicon derived from the steel, on a surface of the steel. Optionally, at least a portion of the silica is removed prior to placing the article in service. In certain non-limiting embodiments of the method, the conditions under which the silica forms on the steel surface include heating the article in an oxidizing atmosphere at a temperature greater than 600° C. for a period of time sufficient to form the silica.

The ferritic stainless steels that may be included in articles processed by methods according to the present disclosure include any silicon-containing ferritic stainless steel. Non-limiting examples of such ferritic stainless steels include silicon-containing AISI Type 430 stainless steel, AISI Type 439 stainless steel, AISI Type 441 stainless steel, AISI Type 444 stainless steel, and E-BRITE® alloy. Given the present methods' advantages, the methods are considered particularly useful as applied to ferritic stainless steels to be used in SOFC interconnects.

Another aspect of the present disclosure is directed a method of making a fuel cell interconnect. The method includes treating a silicon-containing ferritic stainless steel by subjecting the steel to oxidizing conditions under which silica including silicon derived from the steel forms on a surface of the steel. Optionally, at least a portion of the silica is removed from the surface. The treated steel is subsequently fabricated into the fuel cell interconnect. The method reduces the tendency for formation of an electrically resistive silica layer on the ferritic stainless steel interconnect when the interconnect is subjected to high temperature oxidizing conditions in service.

Yet another aspect of the present disclosure is directed to an article of manufacture comprising a ferritic stainless steel including at least a near-surface region that has been depleted of silicon relative to a remainder of the ferritic stainless steel. Such a characteristic reduces the tendency for the formation of an electrically resistive silica layer on a surface of the article when the article is subjected to high temperature oxidizing conditions. In certain non-limiting embodiments according to the present disclosure, a method according to the present disclosure is applied to the article in order to deplete (i.e., reduce or eliminate) silicon in a near-surface region of the steel. According to certain non-limiting embodiments, the article is a mill product (for example, a sheet, a plate, or a bar) or a fuel cell interconnect.

BRIEF DESCRIPTION OF THE DRAWINGS

Features and advantages of certain non-limiting embodiments of the methods, alloys and articles described herein may be better understood by reference to the accompanying drawings in which.

Figure 1:
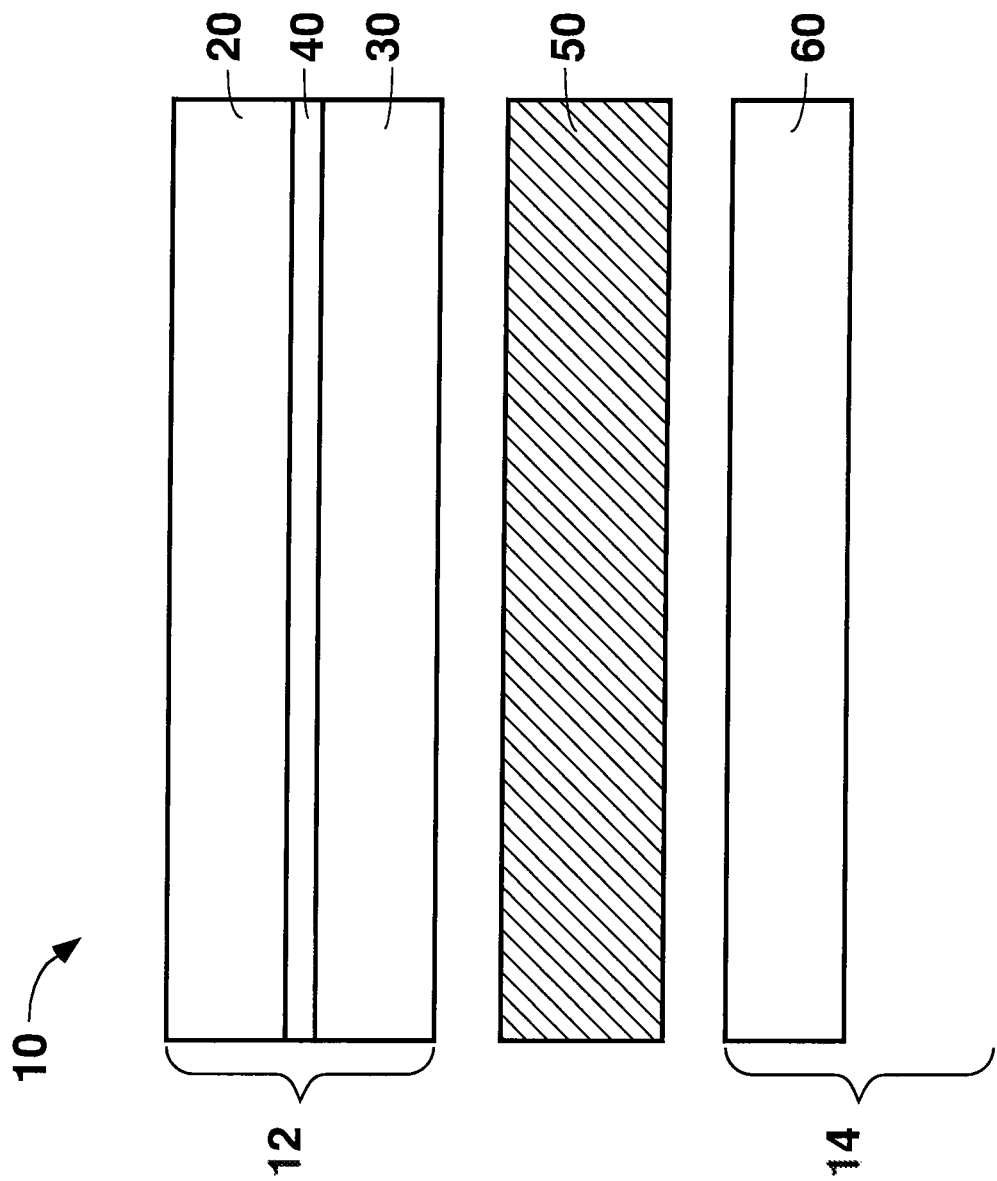
FIG. 1 is a schematic illustration of an embodiment of a PSOFC.

The reader will appreciate the foregoing details, as well as others, upon considering the following detailed description of certain non-limiting embodiments of methods, alloys, and articles according to the present disclosure. The reader also may comprehend certain of such additional details upon carrying out or using the methods, alloys, or articles described herein.

DETAILED DESCRIPTION OF CERTAIN NON-LIMITING EMBODIMENTS

In the present description of non-limiting embodiments and in the claims, other than in the operating examples or where otherwise indicated, all numbers expressing quantities or characteristics of ingredients and products, processing conditions, and the like are to be understood as being modified in all instances by the term "about". Accordingly, unless indicated to the contrary, any numerical parameters set forth in the following description and the attached claims are approximations that may vary depending upon the desired properties one seeks to obtain in the alloys and articles according to the present disclosure. At the very least, and not as an attempt to limit the application of the doctrine of equivalents to the scope of the claims, each numerical parameter should at least be construed in light of the number of reported significant digits and by applying ordinary rounding techniques.

Any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference. Any material, or portion thereof, that is said to be incorporated by reference herein, but which conflicts with existing definitions, statements, or other disclosure material set forth herein is only incorporated to the extent that no conflict arises between that incorporated material and the existing disclosure material.

As discussed above, ferritic stainless steels commonly include moderate amounts of silicon, either as an intentional alloy addition or as a residual impurity. During service as metallic interconnects, within the harsh, high-temperature oxidizing environment present in the fuel cell stack, even minor amounts of silicon can readily diffuse to the alloy/scale interface and form a thin, generally continuous, electrically resistive SiO$_2$ (silica) film. This is particularly problematic for most ferritic and superferritic stainless steels including relatively high levels of silicon, e.g., greater than 0.15 weight percent, but remains an issue for even ultra-low silicon content ferritic stainless steels, often developed specifically for fuel cell interconnect applications. The tendency for silicon segregation and oxidation is high and has been observed to occur in alloys including even very low levels of silicon. This phenomenon can impair the surface electrical conductivity of ferritic stainless steel interconnects and significantly decrease fuel cell efficiency over time.

To address this drawback of ferritic stainless steels, a current approach is to minimize the concentration of silicon within alloys intended for interconnect applications. For example, CROFER 22APU alloy, available from Krupp-VDM, Germany, is generally produced with a silicon content limited to about 0.10 weight percent. The approach of minimizing silicon content, however, has several drawbacks. Controlling silicon to very low levels can be technically difficult and also is expensive, generally requiring the use of premium melting techniques such as vacuum induction melting (VIM), rather than less expensive air melting in conventional electric arc furnaces. Selecting low-silicon content scrap can substantially increase raw material costs. Even reducing silicon to low levels, however, may not be effective due to the extremely strong tendency of silicon within ferritic stainless steels to segregate as a thin, semi-continuous oxide surface layer.

In order to address the above-described deficiencies of certain ferritic stainless steels, the present disclosure, in part, is directed to a method for eliminating or reducing the tendency for formation of electrically resistive silica on the surface of ferritic stainless steels. More particularly, the present disclosure describes unique methods for reducing the formation of an electrically resistive silica layer on the surface of ferritic stainless steel articles when the articles are subjected to the high-temperature oxidizing conditions typically found within SOFCs, conditions to which interconnects are commonly subjected. Such a method involves treating the article to induce formation of silica on a surface of the steel. Optionally, at least a portion of the silica is removed from the surface using a suitable silica removal technique. The article may then, optionally, be further processed to a suitable form, and subsequently placed in service. The method alters the silicon content of at least a sub-surface region of the steel so as to inhibit formation of silica when the treated article is subjected to high-temperature oxidizing conditions in service.

According to one non-limiting embodiment of the methods according to the present disclosure, at least a portion of the silicon in a silicon-containing ferritic stainless steel article is segregated to a surface of the article and oxidized on the surface by "pre-oxidizing" the article for a suitable time in a suitable oxidizing atmosphere. As used herein in connection with embodiments of the methods according to the present disclosure, "article" refers to either a mill product such as, for example, a sheet, a plate, or a bar, and also refers to a finished article of manufacture produced by further processing the mill product to an intermediate or final form. Also, as used herein in connection with embodiments of the methods according to the present disclosure, "oxidizing atmosphere", "partially oxidizing atmosphere", "oxidizing conditions", and like phrases refer to an atmosphere and/or other conditions promoting the formation of oxides on the surface of a ferritic stainless steel article subjected to the atmosphere and/or conditions for a suitable period of time.

Embodiments of the methods according to the present disclosure may be applied to any silicon-containing ferritic stainless steel. Methods according to the present disclosure are considered particularly advantageous when applied to ferritic stainless steel including relatively high levels of silicon such as, for example, at least 0.15 weight percent silicon, but may be applied to any silicon-containing ferritic stainless steel. In general, and without intending to limit the scope of the present disclosure, methods according to the present disclosure may be applied to ferritic stainless steels comprising, in weight percentages: 15 to 30 chromium; up to 6 molybdenum; up to 2 manganese; up to 1 nickel; up to 1 silicon; up to 1 aluminum; up to 0.1 carbon; up to 0.1 nitrogen; up to 1 titanium; up to 1 niobium; up to 1 zirconium; up to 1 vanadium; iron; and incidental impurities. Specific non-limiting examples of ferritic stainless steels to which the methods of the present disclosure may be applied include AISI Types 430, 439, 441, and 444, and E-BRITE® alloy (see Table 1 above), alloys that have been proposed for use in fuel cell interconnect applications.

Non-limiting examples of suitable oxidizing atmospheres that can be used in the pre-oxidizing step include an atmosphere at a suitable oxidizing temperature principally including hydrogen along with a relatively small concentration of oxygen. Other non-limiting examples of suitable oxidizing atmospheres include cracked ammonia or synthetic ammonia, argon or another inert gas or mixture of inert gases, and nitrogen, all of which atmospheres also must include a low concentration of oxygen sufficient to suitably oxidize silicon segregated to the alloy surface. An atmosphere including a large nitrogen concentration, however, may promote nitridation at high temperatures and, thus, is not preferred. Preferably, the concentration of oxygen in the oxidizing atmosphere is such that the atmosphere selectively oxidizes silicon on a surface of the article, while not resulting in the formation on the surface of a significant level of oxides derived from other elements within the stainless steel.

One embodiment of a method according to the present disclosure includes annealing (heating) the ferritic stainless steel article in an oxidizing atmosphere at a temperature similar to, or preferably in excess of, the temperature range to which it is expected the steel will be subjected while in service. In this way it is possible to significantly deplete silicon within a sub-surface region of the steel and thereby reduce the amount of silica formed on surfaces of the article when the article is subjected to high temperature oxidizing conditions in service. More preferably, the annealing treatment is performed at a temperature that is at least 100° C. greater, and even more preferably at least 200° C. greater, than the temperature to which the article will be subjected when in service. With respect to ferritic stainless steels to be used as SOFC interconnect material, the annealing is preferably conducted at a temperature in the range of at least 600° C. up to about 1100° C., and more preferably is conducted at a temperature that is considerably higher (for example, at least 100° C. or at least 200° C. higher) than the conventional 700-800° C. operating temperature that is common for SOFCs.

According to one non-limiting embodiment of a method according to the present disclosure, exposing a ferritic stainless steel article to a partially oxidizing hydrogen-containing atmosphere, preferably including up to about $1 \times 10^{-20}$ atmosphere of oxygen, at a suitably elevated temperature and for a suitable duration results in the formation of silica on the article's surfaces. The silicon for formation of the oxides migrates by solid state diffusion from the bulk of the alloy. Preferably, so as to remove substantial silicon from a near-surface region of the article, the silica layer formed on the steel surface has a thickness of at least 0.5 microns per millimeter thickness of the steel.

According to certain non-limiting embodiments of methods of the present disclosure, all or a portion of the silica formed during the oxidizing treatment is removed using a suitable silica removal technique prior to placing the steel in service. Possible silica removal techniques include mechanical, chemical, and thermochemical techniques capable of removing silica from the surface of a ferritic stainless steel, preferably without also removing a significant amount of the steel underlying the silica. More preferably, the silica removal technique applied to the steel will not remove any of the steel underlying the silica to be removed. Non-limiting examples of possible mechanical silica removal techniques include mechanical abrasion techniques such as, for example, sanding and grinding. Non-limiting examples of possible chemical silica removal techniques include immersing the article in, or applying to the article surface, a caustic or acidic liquid that dissolves silica. Non-limiting examples of possible thermochemical silica removal techniques include immersing the article in, or applying to the article surface, a caustic or acidic liquid that dissolves silica and that is maintained at an elevated temperature suitable to enhance the rate of dissolution of silica. Those of ordinary skill may readily recognize other suitable techniques for removing all or a portion of silica formed on a surface of the steel.

The step of "pre-oxidizing" the article, in essence, utilizes the driving force of oxide formation to segregate at least a portion of the silicon within the steel to a surface of the steel. It is known that low-oxygen atmospheres such as, for example, dry hydrogen atmospheres, remain oxidizing to silicon and certain other alloy ingredients that have solid state mobility and an extremely high affinity for oxygen. The oxygen content of hydrogen is generally determined by assessing the residual water vapor content of the gas since oxygen and water are related through the well known water shift reaction:

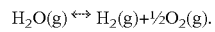

$$H_2O(g) \leftrightarrow H_2(g) + \tfrac{1}{2}O_2(g).$$

Figure 2:
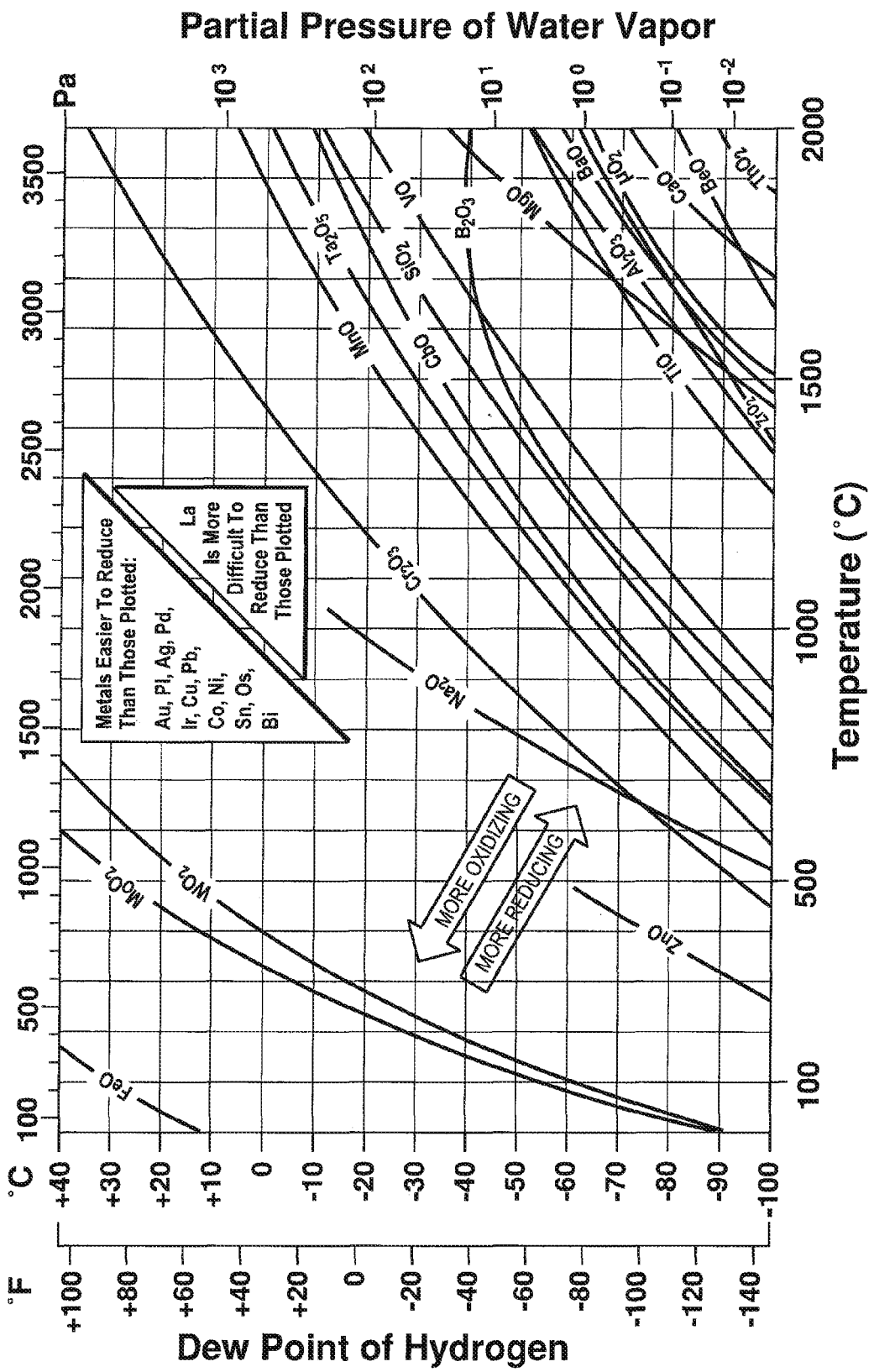
FIG. 2 is a plot showing the relationship between oxygen partial pressure (right-hand Y axis) and water vapor content (left-hand Y axis, measured as dew point) in hydrogen, and including curves plotting stability limits for various oxides at the indicated range of oxygen partial pressures as a function of temperature.

FIG. 2 is a plot showing the relationship between oxygen partial pressure (right-hand Y-axis) and water vapor content (left-hand Y-axis, measured as dew point) in hydrogen. As suggested by the above water shift reaction, as the water vapor content of a gas increases, the oxygen partial pressure within the gas also increases. FIG. 2 also includes curves plotting stability limits for various oxides, at the indicated range of oxygen partial pressures, as a function of temperature.

Given the relationship of the various oxide stability limits at a given temperature, as shown in FIG. 2, the present inventor concluded that by including an oxygen partial pressure that is not too high in an elevated temperature atmosphere also including hydrogen or another suitable non-oxidizing gas or non-oxidizing gas mixture, silicon can be selectively segregated to the alloy surface and oxidized to form silica, while leaving substantially unaffected and in metallic form within the bulk of the alloy other elements such as, for example, manganese and chromium. As FIG. 2 suggests, oxides of silicon are stable at much lower oxygen partial pressures than oxides of chromium and various other elements present in stainless steels. The present inventor concluded that these principles can be applied to ferritic stainless steels to selectively promote silicon migration/segregation and oxidation without significantly promoting migration/segregation and oxidation of chromium and various other alloying elements within the steels. The oxygen partial pressure in the oxidizing atmosphere used in the methods according to the present disclosure preferably is below, and more preferably is just below, the oxygen partial pressure at which oxides of chromium are stable and will form on the steel. For example, the oxygen partial pressure may be up to about $1 \times 10^{-20}$ atmosphere.

Selective segregation of silicon to the alloy surface depletes the steel of silicon without significantly affecting the concentration of various other alloying elements within the steel. Using this technique, ferritic stainless steels may effectively be "pre-oxidized" and depleted of all or a significant concentration of silicon, rendering the steels more suitable for use in applications in which the formation of silica on the steel surfaces is detrimental. Such applications include, for example, those wherein ferritic stainless steel is used to form interconnects for SOFCs, in which case the silica increases contact resistivity of the interconnects. Once selectively segregated to the alloy surface and oxidized, the resulting silica can then be removed from the surface, if desired. Thus, by selecting suitable pre-oxidizing conditions, certain embodiments of methods according to the present disclosure promote formation of silica on surfaces of silicon-containing ferritic stainless steel and thereby result in significant depletion of the silicon in at least a near-surface region of the alloy, preventing or reducing the tendency for silica to form on surfaces of the steel when later subjected to high temperature oxidizing conditions in service.

The following examples describe tests that were conducted and confirmed the utility and operability of methods according to the present disclosure.

Example 1

Figure 3:
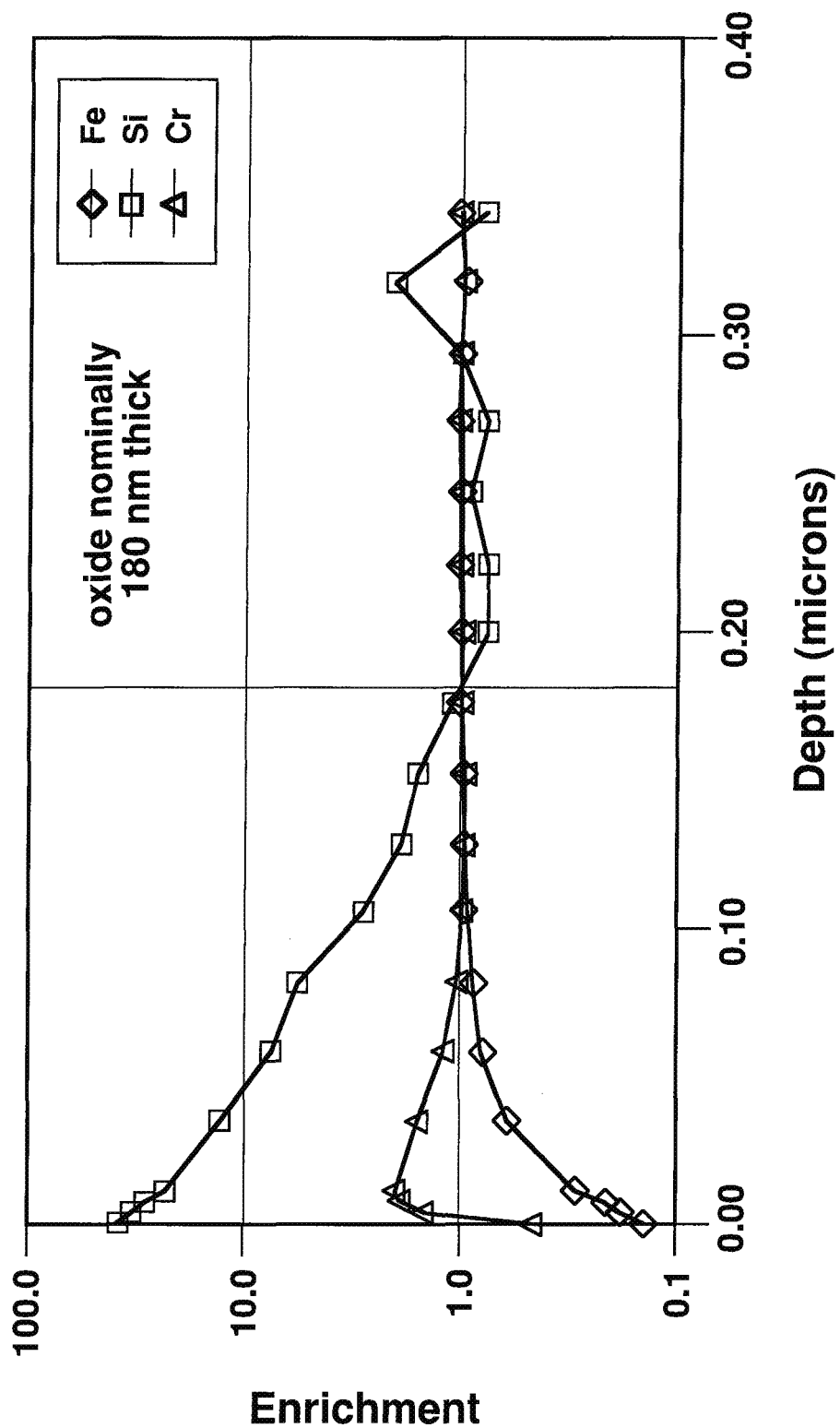
FIG. 3 is an Auger compositional profile, normalized to measure bulk composition, for a Type 430 stainless steel sample panel annealed in hydrogen for approximately 30 minutes at approximately 1010° C.

A 0.5 mm thick sample panel of AISI Type 430 stainless steel, which nominally includes 0.4 weight percent silicon, was annealed in a furnace chamber having a hydrogen atmosphere including a small concentration of water vapor, along with incidental impurities. The dew point of the hydrogen atmosphere was not measured but was believed to be in the range of about −20° C. to 0° C. The panel was heated in the furnace chamber at approximately 1010° C. for 30 minutes time-at-temperature (as measured by a contact thermocouple). The sample panel emerged from the furnace after heating with a dull surface tint, indicating that a relatively thick silica-containing layer (scale) had formed on the panel surface. The test panel was then examined using a scanning Auger microprobe having a depth profiling capability (via an ion sputtering gun). FIG. 3 illustrates the Auger compositional depth profile of the stainless steel sample, normalized to measure bulk composition. FIG. 3 plots relative enrichment of iron, silicon, and chromium in the oxide layer at various depths. Significant segregation of silicon from the alloy bulk to the alloy surface (depth of 0.00 microns) was detected, with an approximately 0.18 micron (180 nm) thick silica layer evident on the surface. The scale/alloy interface (i.e., the original surface of the steel), which was at about 0.18 micron measured from the surface of the scale, is indicated by the vertical line at about the mid-point of FIG. 3. FIG. 3 also shows that only very minor segregation of chromium toward the scale surface occurred as the silica-containing layer formed. FIG. 3 further indicates that no evident segregation of iron occurred during oxide formation. Thus, the trial confirmed that selective migration of silicon from the alloy bulk and pre-oxidation of the silicon on the alloy surface is a viable method of selectively depleting at least a portion of silicon within the alloy.

Calculations suggest that the concentration of silica developed within the scale formed on the 0.5 mm thick Type 430 steel sample would consume approximately 40% by weight of the total silicon within the steel sample. The rate of scale formation (i.e., thickness of scale formed per unit time) is generally independent of substrate thickness for bulk samples and, therefore, it is expected that thinner samples would undergo a greater degree of silicon depletion if heated for a like time period under the same oxidizing conditions. Also, the silicon depletion affect of the present method is likely to be magnified near the surface, that is, in the near-surface region, of the substrate due to the presence of a silicon depletion gradient after the exposure to oxidizing conditions. Because the test was conducted at a temperature (1010° C.) that is well above the normal operating temperature range of SOFCs (approximately 700-800° C.), it is believed that the silicon-depleted alloy layer immediately adjacent and underlying the alloy surface would present a long diffusion distance for re-supply of silicon to the alloy surface from the bulk of the alloy when the alloy is subjected to high temperature oxidizing conditions in service. This effect would be complementary to the overall reduction in alloy silicon content provided by the pre-oxidation treatment, and it is believed it would be particularly helpful to inhibiting formation of silica on the surface of interconnects and other articles formed of ferritic stainless steels when such alloys are exposed to high-temperature oxidizing conditions, such as the operating conditions within SOFCs. More generally, it is believed that additional advantages may be obtained by subjecting the alloy to pre-oxidizing conditions more strongly promoting formation of silicon-containing oxides than would be encountered during the service life of final components formed from the alloy. Doing so may substantially deplete silicon from a near-surface region of the alloy and better inhibit formation of such oxides when the alloy is subjected to service conditions.

After formation of the silica layer on the test panel, small coupons were cut from the panel. Several of the coupons were left as-oxidized. Other coupons were subjected to a post-oxidation treatment to remove all or a portion of the oxide scale. The scale removal treatments used were (i) immersion of the coupon in 0.1M hydrofluoric acid for about 2 minutes and (ii) immersion of the coupon in 1M sodium hydroxide at about 60° C. for about 30 minutes. It is believed that the acid treatment would remove bulk alloy along with the scale if the coupon were immersed for a sufficient time period. Thus, the steel preferably is subjected to relatively aggressive removal treatments, such as hydrofluoric acid solutions, for a relatively limited duration in order to avoid removal of silicon-depleted near-surface alloy. The particular base treatment used, on the other hand, should leave unaffected the underlying alloy substrate and, thus, the exposure time may be relatively liberal.

Figure 4:
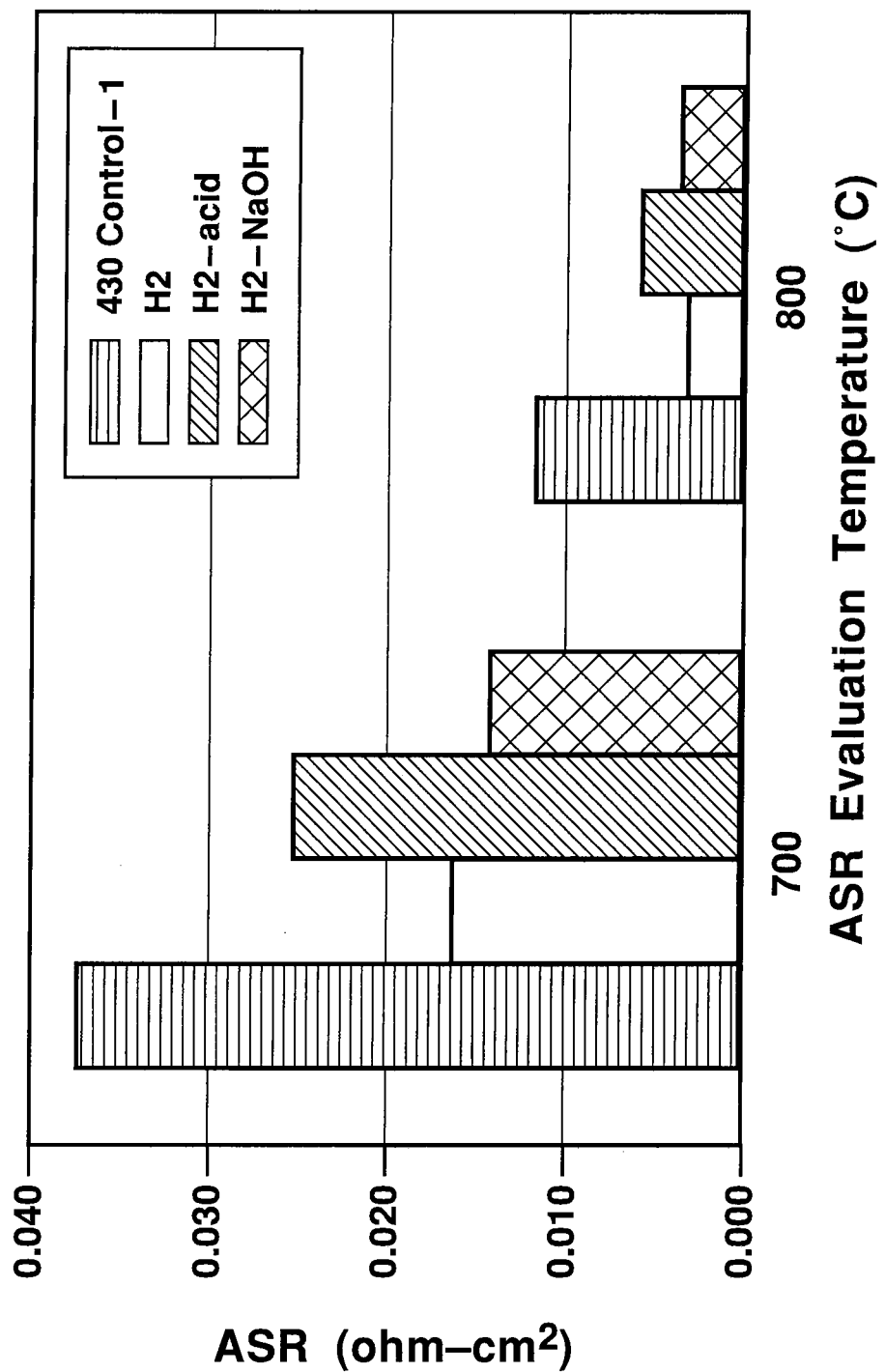
FIG. 4 is a plot of ASR values (ohm-cm$^2$) obtained at 700° C. and 800° C. testing temperatures for several ferritic stainless steel samples prepared as described herein.

The as-annealed coupons and the coupons subjected to the acid or base solutions were then oxidized in air at about 800° C. for about 500 hours, resulting in the formation of a relatively thick (1-2 micron) oxide scale on the coupons. The scale thicknesses formed on the samples were generally similar to scale thicknesses that would be expected to form on ferritic stainless steel interconnects during their service life. The as-oxidized coupons and the coupons that were subjected to the acid or base scale removal treatments were then evaluated for area specific resistivity (ASR) at either 700° C. or 800° C. ASR is a measure of contact electrical resistivity, with the goal being to achieve as a low an ASR value as possible in order to optimize electrical conductivity at the testing temperature. FIG. 4 is a plot of ASR values (ohm-cm$^2$) obtained at the 700° C. and 800° C. testing temperatures (spanning the typical SOFC operating temperature range) for the foregoing samples as follows: (1) samples of Type 430 stainless steel that were not subjected to pre-oxidation treatment ("430 Control-1" in FIG. 4); (2) as-oxidized samples, which were pre-oxidized as discussed above but were not subjected to further processing to remove the resulting oxide scale ("H2"); (3) samples that were pre-oxidized, immersed in hydrofluoric acid solution to remove all or a portion of the scale, and then oxidized at 800° C., as discussed above ("H2-acid"); and (4) samples that were pre-oxidized, immersed in sodium hydroxide solution, and then oxidized at 800° C., as discussed above ("H2-NaOH"). FIG. 4 shows that the method including pre-oxidation and oxide scale removal steps is relatively effective at limiting contact resistance as evaluated at 700° C., and is even more effective as evaluated at 800° C. ASR reductions achieved by application of embodiments of methods according to the present disclosure ranged the from approximately 50% when evaluated at 700° C., to approximately 75% when evaluated at 800° C. Silicon was actually removed from the alloy by the techniques applied, and it is likely that silicon mobility within the alloy is greater at 800° C. and would cause greater problems in terms of increased electrical resistivity if not depleted from at least the near-surface region before the alloy is placed in service.

FIG. 4 shows that the treated samples (2, 3 and 4) had lower ASR values at each test temperature than the untreated samples (1). Of the pre-oxidized samples (2, 3 and 4), the acid-cleaned samples (3) exhibited the worst ASR values at both test temperatures. Without intending to be bound by any particular theory of operation, it is believed that at least a portion of the beneficial silicon-depleted region beneath the oxide scale of the sample was removed along with the oxide scale by the acid cleaning treatment applied in the testing, allowing for a relatively short path of migration of silicon from the bulk of the alloy. Thus, it is believed that judicious adjustment of parameters of the scale removal step, if applied, would help to limit undesirable removal of silicon-depleted alloy regions underlying the oxide scale, thereby better inhibiting formation of silica when the alloy is subjected to oxidizing conditions during the service lifetime of articles formed of the alloy.

The pre-oxidized samples cleaned of silica using the sodium hydroxide solution (4) performed in the ASR testing in a manner similar to the as-annealed samples (2). This indicates that the silica-containing scale formed on the as-annealed samples was disrupted during subsequent high temperature oxidation of the samples. It was not evident from the testing whether this phenomenon would be present if a relatively thicker silica-containing scale were formed during the pre-oxidation treatment, prior to removing all or part of the scale, if desired, or prior to placing the steel in service.

Example 2

Several coupons of AISI Type 441 stainless steel having the alloy chemistry shown in Table 2 (shown in weight percentages) were prepared. Several of the coupons were heated at 1850° F. (1010° C.) in a mesh-belt furnace in a hydrogen atmosphere including a small concentration of water vapor. The water vapor concentration corresponded to a dew point of nominally −20° C. The coupons were within the heating zone of the furnace for approximately 30 minutes. The heat treatment produced a silica scale on the surface of the heated coupons, and these coupons are referred to in this example as the "pre-oxidized" samples. Other coupons of the same steel were not subjected to the heat treatment and are referred to in this example as "untreated" samples. It is known to form a homogenous single phase manganese cobaltite spinel ("MC") coating on the surfaces of ferritic stainless steel SOFC interconnects to protect the fuel cells from chromium poisoning and to improve interconnect stability. To better simulate in-service conditions, several pre-oxidized samples and several untreated samples were coated with an MC coating using a third party process before testing.

TABLE 2

| Element | Concentration (wt. %) |
|---|---|
| Carbon | 0.010 |
| Manganese | 0.33 |
| Phosphorus | 0.024 |
| Sulfur | 0.0010 |
| Silicon | 0.47 |
| Chromium | 17.61 |
| Nickel | 0.20 |
| Aluminum | 0.045 |
| Molybdenum | not detected |
| Copper | 0.070 |
| Niobium | 0.46 |
| Tantalum | 0.001 |
| Vanadium | 0.044 |
| Titanium | 0.18 |
| Nitrogen | 0.012 |
| Cobalt | not detected |
| Tungsten | not detected |
| Tin | 0.015 |
| Lead | 0.0010 |
| Boron | not detected |

Uncoated pre-oxidized samples, MC coated pre-oxidized samples, and MC coated untreated samples were tested by placing test samples of the same type on either side of a thin block of lanthanum strontium manganate (LSM) ceramic. A thin layer of LSM ink was painted on the contacting faces to better ensure intimate contact between the samples and the LSM ceramic. An electrical current was impressed across the steel-LSM-steel "sandwich" using a power supply, and the resulting voltage established between the steel samples, across the ceramic, was measured. The voltage was converted to area specific resistivity (ASR) and reported in mohm-cm$^2$, which is a normalized measure of the relative ease or difficulty of electrical current to move across the sandwich. A lower ASR is desirable as it equates to lower contact electrical resistivity between the steel samples and the ceramic. As the ASR of an interconnect increases, the fuel cell output decreases and, therefore, the energy generation process becomes less efficient. As ASR continues to increase over time, the fuel cell eventually may stop generating electric current. Therefore, it is desirable to use materials in fuel cell interconnects with an ASR that is initially low and increases at a very slow rate.

Figure 5:
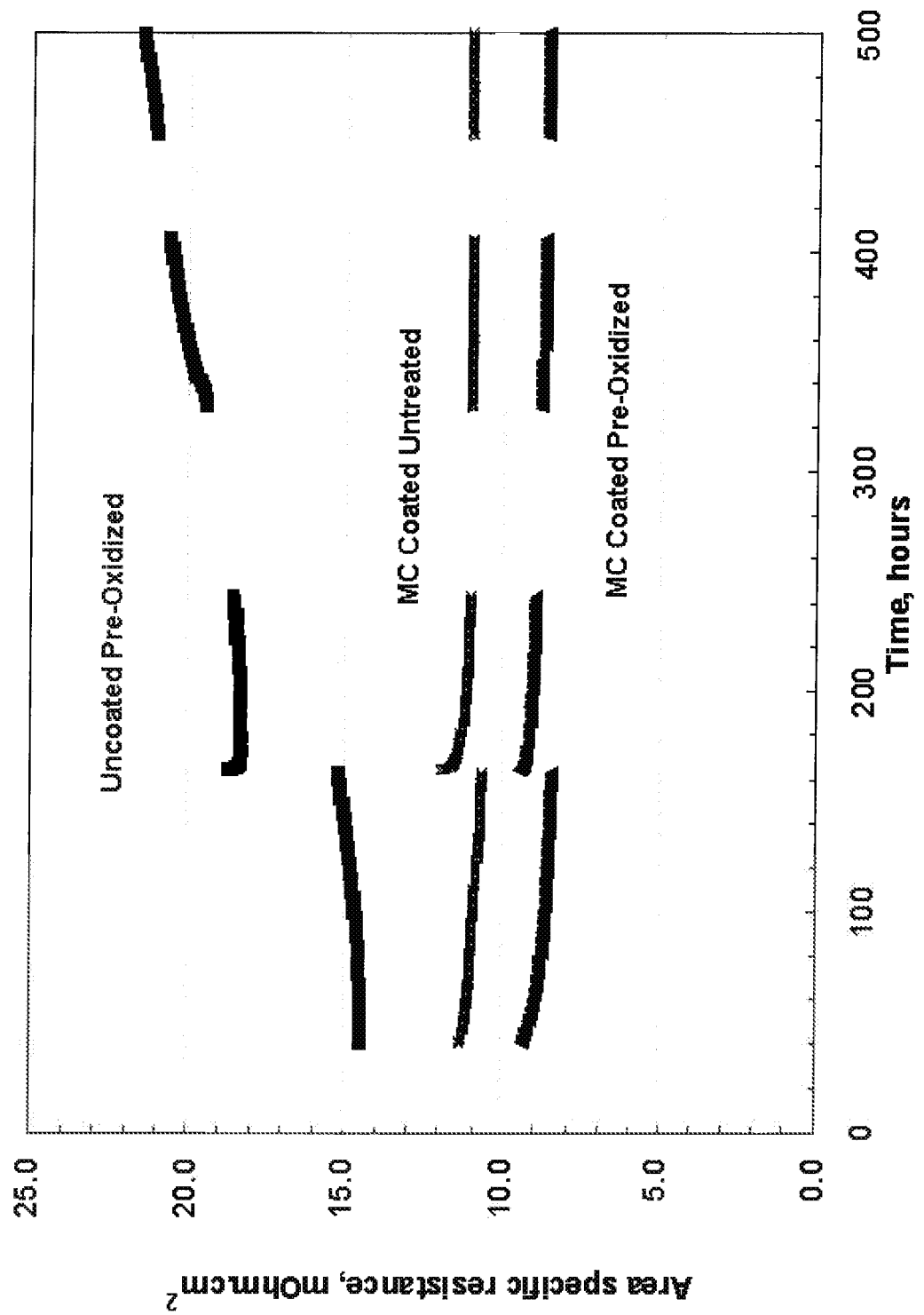
FIG. 5 is a plot of ASR values (ohm-cm$^2$) obtained at a 800° C. test temperature in air for various steel-ceramic-steel "sandwich" assemblies monitored over 500 hours.

The sandwiches were held at a furnace chamber temperature of 800° C. in air and the voltage across each heated sandwich was continuously monitored for 500 hours in the manner described above. FIG. 5 graphically depicts the results of heating the sandwiches in the high-temperature oxidizing test environment. Gaps in the curves of FIG. 5 resulted from a temporary power loss at approximately 165 hours and from data losses during the periods of approximately 245-315 hours and 405-445 hours. FIG. 5 clearly shows that sandwiches including the MC coated pre-oxidized samples had a significantly lower ASR over the entire test period when heated in the oxidizing test atmosphere. These results clearly confirm that treating the ferritic stainless steel samples by a pre-oxidizing process according to the present disclosure reduced initial ASR and ASR over time versus a sandwich including coated untreated test samples. This significant reduction in electrical contact resistivity would result in a significant enhancement in the performance and/or service life of SOFCs incorporating interconnects composed of the pre-oxidized stainless steels. As expected, the uncoated pre-oxidized samples produced an ASR that was greater than the coated pre-oxidized samples. Given the test results, it is expected that uncoated samples that were pre-oxidized using a process according to the present disclosure would result in ASR values, both initially and over time, that are significantly less than uncoated untreated test samples.

Example 3

Coupons of the following ferritic stainless steels used in interconnect applications were prepared: AISI Type 430 (UNS S43000); Type 439 (UNS S43035); Type 441 (UNS S44100); and E-BRITE® alloy (UNS S44627). Coupons of Types 430, 439, and 441 were pre-oxidized to remove silicon from sub-surface regions of the coupons using the technique described above in Example 2 (i.e., 1010° C. for 30 minutes). Other coupons were left untreated. The coupons were then heated at 800° C. in simulated anode gas (SAG) for a time in excess of 1000 hours, and the normalized weight change (mg/cm$^2$) of each sample was determined periodically. The SAG consisted of 4 vol. % hydrogen, 3 vol. % water vapor, and balance argon, and simulated the fuel side environment within a SOFC. The oxygen content within the SAG was low, but sufficient to oxidize the samples.

Figure 6:
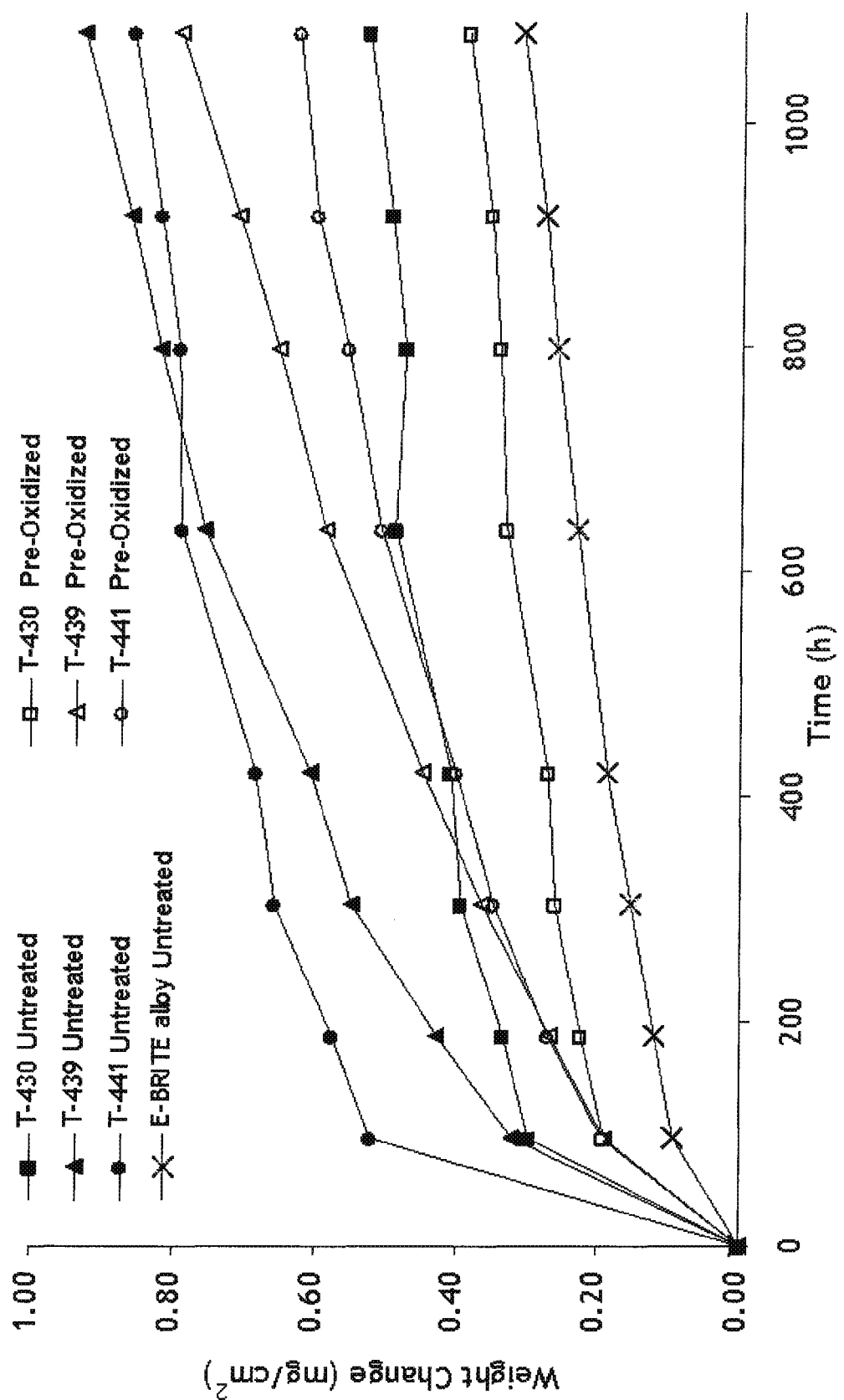
FIG. 6 is a plot of weight change (mg/cm$^2$) over time for various treated and untreated ferritic stainless steel samples heated in a simulated anode gas.

FIG. 6 is a plot of the test results. Pre-oxidation (i.e., desiliconization) was uniformly beneficial to the samples heated in the SAG. The results confirm that the pre-oxidation treatment according to the present disclosure for removing silicon from subsurface regions of ferritic stainless steels reduces the rate of oxidation of the pre-oxidized steels when subjected to environments simulating those to which an interconnect is subjected within a SOFC.

FIG. 6 shows that E-BRITE® alloy in the untreated state exhibited the lowest weight change of any of the test samples. E-BRITE® alloy, however, is a more costly material given that, for example, it includes at least about 10 weight percent more chromium than the other ferritic stainless steels tested. In any case, it is expected that pre-oxidizing E-BRITE® alloy samples using the technique applied to the other samples would have resulted in a reduced weight gain relative to the untreated E-BRITE® alloy samples.

Accordingly, embodiments of methods according to the present disclosure involve subjecting an article (such as, for example, a mill product, an interconnect, or another part) composed of a silicon-containing ferritic stainless steel to a pre-oxidation treatment adapted to promote formation of an external surface oxide layer including silica derived from silicon present in the steel. All or a portion of the silica-containing oxide scale may be removed by a suitable silica removal technique such as, for example, a suitable mechanical, chemical, or thermochemical technique. Non-limiting examples of chemical scale removal techniques, discussed above, include applying an acid or caustic liquid to the scale. It may be advantageous to heat the liquid in order to speed dissolution of the scale within the liquid and, thus, a thermochemical technique (involving a heated chemical) may be preferable to a immersion in a room-temperature liquid bath.

The pre-oxidizing treatment serves to deplete silicon from at least a portion of the substrate, primarily near the steel surface, which in turn decreases the tendency for silica formation on the surface of the substrate when subjected to subsequent elevated temperature or other oxidizing conditions. Removing all or a portion of the silica scale appears to be beneficial in terms of better inhibiting formation of silica when the treated surface is later subjected to oxidizing conditions in service. Nevertheless, methods according to the present disclosure also appear to inhibit in-service silica formation even if the silica formed on the steel during pre-oxidation step is not removed. In cases in which the silica scale formed during pre-oxidation is not removed, it is possible that the oxide scale that grows outward when the steel part is in service disrupts the thin silica scale formed during pre-oxidation. Absent pre-oxidizing the alloy, however, a semi-continuous silica layer may readily form in situ under the scale that grows on the alloy when in service, and in that interface region the silica disrupts the surface electrical conductivity of the alloy.

The foregoing examples of possible methods, alloys, and articles according to the present disclosure are offered by way of example only, and are not exhaustive of all methods, alloys, and articles within the scope of the present disclosure. Those having ordinary skill, upon reading the present disclosure, may readily identify additional methods, alloys, and articles. Also, those having ordinary skill in the art will be capable of fabricating the various articles described herein from the alloys described herein and according to the present disclosure, as such knowledge exists within the art. For example, those having ordinary skill may readily fabricate fuel cell interconnects from suitably dimensioned ferritic stainless steel mill products. As such, a detailed description of the fabrication is unnecessary herein.

Although the foregoing description has necessarily presented only a limited number of embodiments, those of ordinary skill in the relevant art will appreciate that various changes in the details of the examples that have been described and/or illustrated herein may be made by those skilled in the art, and all such modifications will remain within the principle and scope of the present disclosure as expressed herein and in the appended claims. It will also be appreciated by those skilled in the art that changes could be made to the embodiments above without departing from the broad inventive concept thereof. It is understood, therefore, that this invention is not limited to the particular embodiments disclosed herein, but it is intended to cover modifications that are within the principle and scope of the invention, as defined by the claims.

I claim:

1. A method of reducing the tendency for formation of an electrically resistive silica layer on an article comprising a silicon-containing ferritic stainless steel when the article is subjected to high temperature conditions in use, the method comprising:
   prior to placing the article in use, subjecting the article to an oxygen-containing atmosphere under conditions wherein silicon is selectively segregated from the steel to a surface of the steel without segregating chromium and other alloying elements in the steel to the surface of the steel, wherein the oxygen-containing atmosphere is a gaseous atmosphere comprising oxygen at a partial pressure not greater than $1\times10^{-20}$ atmosphere; and wherein the silicon is oxidized to form a silica layer on the surface of the steel and the silica layer is not removed from the surface.

2. The method of claim 1, wherein subjecting the article to an oxygen-containing atmosphere under conditions wherein silicon is selectively segregated from the steel to a surface of the steel comprises:

heating the article in the oxygen-containing atmosphere.

3. The method of claim 2, wherein the method depletes a portion of the silicon from a near-surface region of the steel.

4. The method of claim 3, wherein the steel comprises at least 0.15 weight percent silicon.

5. The method of claim 3, wherein the steel comprises, in weight percentages: 15 to 30 chromium; 0 to 6 molybdenum; up to 2 manganese; up to 1 nickel; up to 1 silicon; up to 1 aluminum; up to 0.1 carbon; up to 0.1 nitrogen; up to 1 titanium; up to 1 niobium; up to 1 zirconium; up to 1 vanadium; iron; and incidental impurities.

6. The method of claim 3, wherein the steel is selected from the group consisting of AISI Type 430 stainless steel, AISI Type 439 stainless steel, AISI Type 441 stainless steel, AISI Type 444 stainless steel, and UNS S44627 stainless steel.

7. The method of claim 2, wherein heating the article comprises heating the article at a temperature greater than a temperature to which the article will be subjected in service.

8. The method of claim 2, wherein heating the article comprises heating the article at a temperature at least 100° C. greater than a temperature to which the article will be subjected in service.

9. The method of claim 2, wherein heating the article comprises heating the article at a temperature at least 200° C. greater than a temperature to which the article will be subjected in service.

10. The method of claim 2, wherein heating the article comprises heating the article at a temperature of at least 600° C.

11. The method of claim 2, wherein heating the article comprises heating the article at a temperature in the range of 600° C. to 1100° C.

12. The method of claim 2, wherein heating the article comprises heating the article at a temperature in the range of 600° C. to 1100° C.

13. The method of claim 2, wherein the oxygen-containing oxidizing atmosphere is a gaseous atmosphere consisting essentially of hydrogen, a partial pressure of no more than $1\times10^{-20}$ atmosphere oxygen, and incidental impurities.

14. The method of claim 13, wherein heating the article comprises heating the article at a temperature in the range of 600° C. to 1100° C.

15. The method of claim 2, wherein heating the article in an oxygen-containing atmosphere comprises heating the article at a temperature of at least 600° C. for at least 2 minutes time-at-temperature.

16. The method of claim 2, wherein the silica layer formed on the surface is a layer having a thickness of at least 0.5 microns per millimeter thickness of the article.

17. The method of claim 1, wherein the article is selected from the group consisting of a mill product, a sheet, and a fuel cell interconnect.

18. A method of treating a fuel cell interconnect comprising a silicon-containing ferritic stainless steel to reduce the tendency for formation of an electrically resistive silica scale on a surface of the interconnect when subjected to high temperature conditions in service, the method comprising:

prior to placing the interconnect in service, subjecting the interconnect to an oxygen-containing atmosphere under conditions wherein silica including silicon derived from the stainless steel forms on a surface of the stainless steel and wherein chromium and other alloying elements in the steel do not segregate to the surface of the steel;

wherein the oxygen-containing atmosphere is a gaseous atmosphere comprising oxygen at a partial pressure not greater than $1\times10^{-20}$ atmosphere; and wherein the silica is not removed from the surface of the stainless steel.

19. The method of claim 18, wherein the stainless steel is a silicon-containing ferritic stainless steel comprising, in weight percentages: 15 to 30 chromium; 0 to 6 molybdenum; up to 2 manganese; up to 1 nickel; up to 1 silicon; up to 1 aluminum; up to 0.1 carbon; up to 0.1 nitrogen; up to 1 titanium; up to 1 niobium; up to 1 zirconium; up to 1 vanadium; iron; and incidental impurities.

20. The method of claim 18, wherein the stainless steel is selected from the group consisting of AISI Type 430 stainless steel, AISI Type 439 stainless steel, AISI Type 441 stainless steel, AISI Type 444 stainless steel, and UNS S44627 stainless steel.

* * * * *